United States Patent
Libakken

(10) Patent No.: US 10,759,222 B2
(45) Date of Patent: Sep. 1, 2020

(54) ROLLING DEVICE, A PIECE OF FURNITURE COMPRISING A ROLLING DEVICE AND A USE OF THE ROLLING DEVICE

(71) Applicant: WHEEL.ME AS, Snarøya (NO)

(72) Inventor: Rolf Libakken, Båtsjord (NO)

(73) Assignee: WHEEL.ME AS, Snaroya (NO)

( * ) Notice: Subject to any disclaimer, the term of this patent is extended or adjusted under 35 U.S.C. 154(b) by 0 days.

(21) Appl. No.: 15/115,019

(22) PCT Filed: Feb. 6, 2015

(86) PCT No.: PCT/IB2015/050907
§ 371 (c)(1),
(2) Date: Jul. 28, 2016

(87) PCT Pub. No.: WO2015/118492
PCT Pub. Date: Aug. 13, 2015

(65) Prior Publication Data
US 2016/0339742 A1      Nov. 24, 2016

(30) Foreign Application Priority Data

Feb. 6, 2014  (NO) .................................. 20140145
Apr. 28, 2014  (NO) .................................. 20140520

(51) Int. Cl.
*B60B 33/08*    (2006.01)
*B60B 33/06*    (2006.01)
*B60B 33/00*    (2006.01)

(52) U.S. Cl.
CPC ........ *B60B 33/063* (2013.01); *B60B 33/0015* (2013.01); *B60B 33/0047* (2013.01);
(Continued)

(58) Field of Classification Search
CPC ......... B60B 33/06; B60B 33/08; B60B 33/04; B60B 33/05; B60B 33/063; Y10T 16/193;
(Continued)

(56) References Cited

U.S. PATENT DOCUMENTS 2,671,242 A * 3/1954 Lewis ..................... B60B 33/06
16/26
2,687,546 A * 8/1954 Oppenheimer ......... B60B 33/08
16/26
(Continued)

FOREIGN PATENT DOCUMENTS

DE    10 2004 030 113    1/2006
GB             882129 A  * 11/1961 ............. B60B 33/06

OTHER PUBLICATIONS

International Search Report dated May 8, 2015 in International (PCT) Application No. PCT/IB2015/050907.

*Primary Examiner* — Emily M Morgan
(74) *Attorney, Agent, or Firm* — Wenderoth, Lind & Ponack, L.L.P.

(57) ABSTRACT

A rolling device for a device that is to be moved along a surface is described. The rolling device comprises a cylinder with an opening at one end and a piston that is arranged reciprocally movably in the cylinder such that the piston can be moved between an upper position in the cylinder and a lower position in the cylinder. The piston comprises a rolling element that is arranged in a first end portion of the piston that faces the cylinder opening and that rolls on the surface when the device is to be moved. The rolling device further comprises an actuator system for movement of the piston between the upper position and the lower position in the cylinder.

8 Claims, 7 Drawing Sheets

(52) U.S. Cl.
CPC ...... *B60B 33/0063* (2013.01); *B60B 33/0089* (2013.01); *B60B 33/0092* (2013.01); *B60B 33/08* (2013.01); *B60B 2200/20* (2013.01); *B60B 2900/351* (2013.01); *B60B 2900/531* (2013.01)

(58) Field of Classification Search
CPC .............. Y10T 16/1937; Y10T 16/188; Y10T 16/1889
See application file for complete search history.

(56) References Cited

U.S. PATENT DOCUMENTS

| | | | |
|---|---|---|---|
| 2,937,879 A | | 5/1960 | Lion |
| 4,108,455 A | | 8/1978 | James |
| 4,657,104 A | * | 4/1987 | Holland .................. B25J 5/007 180/211 |
| 4,660,994 A | | 4/1987 | Masciarelli |
| 8,196,944 B1 | * | 6/2012 | Vondrak .................. A61G 5/02 280/250.1 |
| 8,342,270 B2 | * | 1/2013 | Takenaka ................ B60B 19/00 180/7.1 |
| 8,464,372 B2 | * | 6/2013 | Mitchell .................. A47D 9/02 5/101 |
| 8,820,850 B2 | * | 9/2014 | Moser ..................... B60B 19/14 301/5.1 |
| 2003/0150079 A1 | * | 8/2003 | Takai ...................... B60B 33/08 16/26 |
| 2012/0144937 A1 | * | 6/2012 | Moser ..................... B60B 19/14 73/865.8 |

* cited by examiner

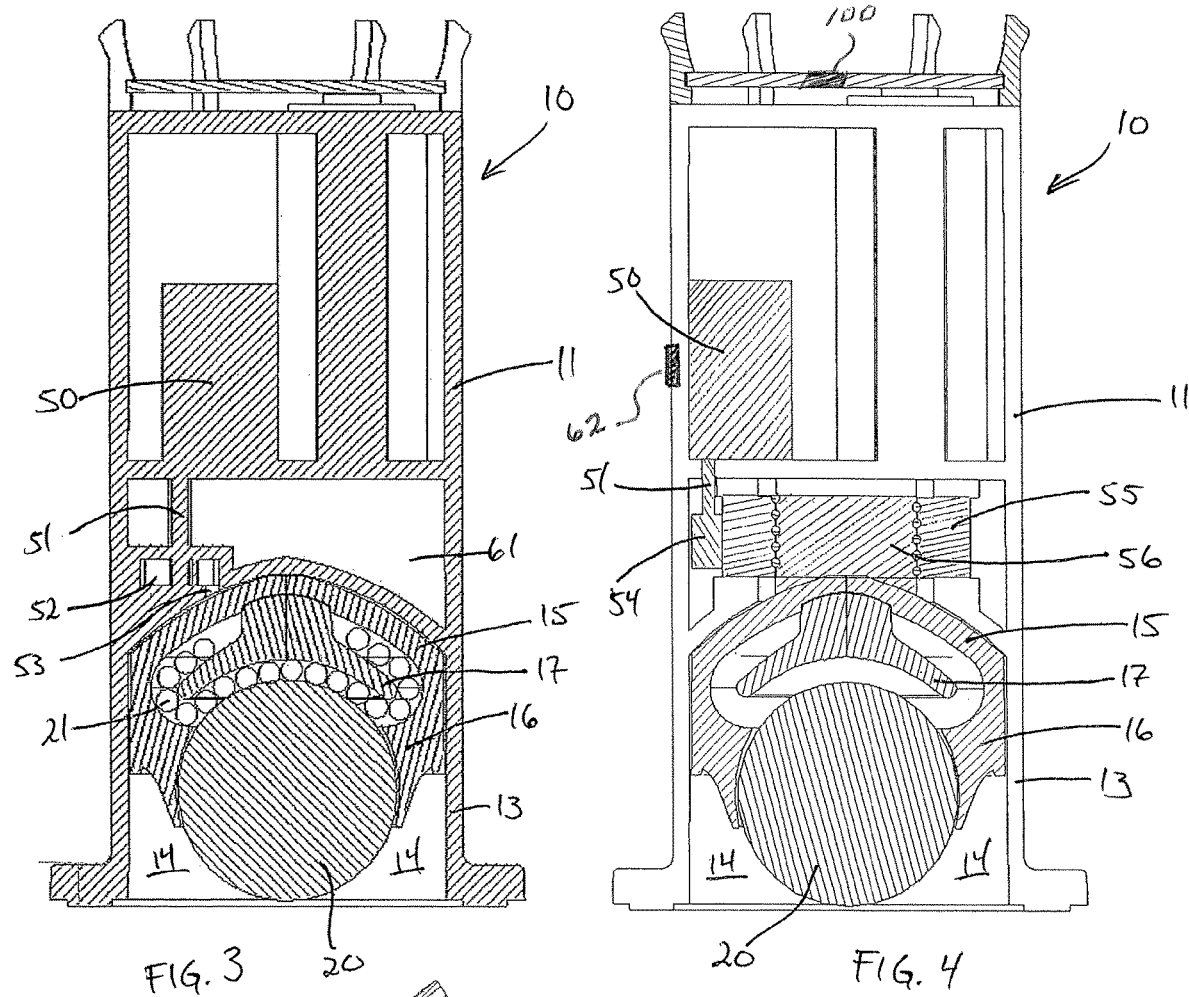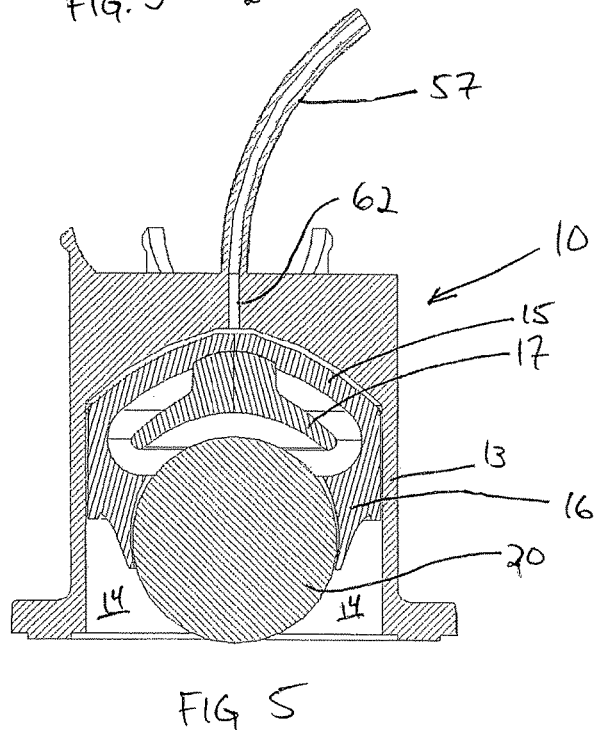

ROLLING DEVICE, A PIECE OF FURNITURE COMPRISING A ROLLING DEVICE AND A USE OF THE ROLLING DEVICE

BACKGROUND OF THE INVENTION

1. Technical Field

The present invention relates to a rolling device for integration into a device along a surface, for example, a piece of furniture, a wall or the like that is to be moved across a floor.

In many instances it is necessary to move furniture, for example, to gain access in order to clean under and behind a piece of furniture. To make it easier to move the piece of furniture, the piece of furniture may be provided with different types of wheels. There are also other types of devices that are moved regularly and which therefore can be provided with wheels that facilitate and allow moving. These devices may, for example, be lightweight partition walls that are to be movable in order to change the interior floor plan layout. Many other cases where it may be desirable to move similar structural elements are also conceivable.

2. Description of the Related Art

The applicant has previously developed a rolling device as described in Norwegian Patent NO 316760 B1. The rolling device described in NO 316760 B1 comprises a cylindrical sleeve device that is arranged in, for example, the leg of a piece of furniture, and a piston that is movably arranged in the cylindrical sleeve device. A ball-shaped or spherical wheel is arranged in the piston. The piston is movable, with the aid of a click system comprising a spring, between an upper position and a lower position. When the piston is in the lower position, the piece of furniture can be rolled across the floor it is standing on, whilst when the piston is in the upper position, the wheel is inside the cylindrical sleeve device and the leg of the piece of furniture, in which the rolling device is arranged, thus stands on the floor. The piece of furniture thus stands in the desired position without rolling inadvertently across the floor when small forces are applied to the piece of furniture.

The problem with the rolling device described in NO 316760 B1 is that the piece of furniture is designed with a click system which requires the piece of furniture to be lifted in order to allow the piston to move between the two positions. This can for many people be a problem if the piece of furniture is heavy in weight compared to what they are able to lift and/or that the piece of furniture has an unmanageable shape that makes it difficult to grip with hands to be able to lift the piece of furniture or that it is positioned in such manner that it is difficult or impossible to lift the piece of furniture.

Another problem with the rolling device in NO 316760 B1 is that the spherical wheel has some freedom of movement in the locking part, in which the spherical wheel is arranged, so that the spherical wheel can be pressed into the locking part. In addition, the spherical wheel can be made of a rubber material, which means that the wheel to a certain extent can change shape when loaded. The result is that the spherical wheel in some cases may press against one or more of the bearing balls such that it is difficult or impossible to get the piece of furniture to roll across the surface.

SUMMARY OF THE INVENTION

The object of the present invention is therefore to provide a rolling device capable of being integrated in devices, such as a piece of furniture, a movable wall etc., for moving the device along a surface, and which can be used by everyone regardless of physical condition and capacity to lift different devices in which the rolling device is integrated.

It has also been an object of the invention that the device, in which the rolling device is integrated, should be easily movable along the surface when so desired, and able to stand steady in a particular location when so desired.

It has further been an object of the invention to find a solution that improves the rolling properties of the spherical wheel.

A rolling device is provided for a device that is to be moved along a surface. The rolling device comprises a cylinder with an opening at one end and a piston that is arranged reciprocally movably in the cylinder such that piston can be moved between an upper position in the cylinder and a lower position in the cylinder. The piston comprises a rolling element that is arranged at a first end portion of the piston facing the cylinder opening and which rolls on the surface when the device is to be moved. The rolling device further comprises an actuator system for movement of the piston between the upper position and the lower position in the cylinder. In the upper position, the piston is preferably retracted so far into the cylinder that the rolling device is within the cylinder and is not capable of rolling on a surface. In the lower position, the piston is pushed so far out towards the cylinder opening that at least such a large part of the rolling device is outside the cylinder opening that the rolling device is able to roll on a surface.

The rolling element is preferably ball-shaped or spherical, but may also have other shapes, for example, the rolling element may be configured as a wheel.

If the rolling element is a wheel, it can be attached to the first end portion of the piston such that it is able to rotate about a horizontal axis of rotation. The piston can further be a two-part piston, where an upper piston part and a lower piston part are rotatably connected to each other such that the lower piston part is able to rotate about a vertical axis. The piston and the wheel can thus be retracted into the cylinder. Alternatively, the wheel may be journalled in a bracket part such that the wheel can rotate about a horizontal axis, whilst the bracket part is rotatably fastened to the first end portion of the piston such that the bracket part, and thus also the wheel, can rotate about a vertical axis. When the piston is moved in and out of the cylinder, the wheel will follow the piston motion in a reciprocal movement. The bracket part may be a separate part that does not move into the cylinder, or only partly into the cylinder, as the piston is retracted into the cylinder. The last-mentioned solution, where bracket part and wheel are not retracted into the cylinder can, for example, be used on a device, such as, for instance, a bed, which has a skirt extending around the device and on which the device stands when the piston is in the upper position, whilst when the piston is moved into the lower position, the device will stand on the wheels and can thus be moved across the surface on which the device is standing.

The actuator system can be configured in different ways. In an embodiment of the invention, the actuator system can comprise a gas tank for storage of pressurized gas and a fluid connection between the gas tank and a cylinder volume in the cylinder and from the cylinder volume and out of the rolling device, and at least one valve device that controls the flow of gas from the gas tank to the cylinder volume and/or from the cylinder volume and out of the rolling device. The actuator system can further comprise an inlet valve device that controls the flow of gas from the gas tank to the cylinder volume and an outlet valve device that controls the flow of gas from the cylinder volume and out of the rolling device. The inlet valve device preferably comprises a solenoid and a valve rod that is connected to the solenoid and rests against a valve membrane that admits and shuts off flow of gas from the gas tank to the cylinder volume. The rolling device may further comprise a rod that is attached to the piston and an arm that is connected to the rod and the valve rod of the inlet valve device, such that the valve rod is pressed against the valve membrane as the piston reaches the lower position in the cylinder, whereby the valve membrane shuts off flow of gas from the gas tank to the cylinder volume. The outlet valve device can comprise a solenoid and a valve rod that is connected to the solenoid and rests against a valve membrane that regulates flow of gas from the cylinder volume and out of the rolling device. The gas tank is preferably an integrated part of the rolling device, for example, in that it is an extension of the cylinder, but can also be a separate unit that is fluid connected to the rolling device such that gas can flow between the gas tank and the cylinder in the rolling device.

The actuator system can alternatively comprise a reservoir for a liquid and an electromotor that drives a pump that pumps liquid from the reservoir to a cylinder volume in the cylinder through a fluid connection through a fluid channel. In an embodiment of the invention, the fluid channel can comprise a valve device able to admit flow of liquid from the cylinder volume back to the reservoir.

Alternatively, the actuator system can comprise a toothed wheel that is fastened to the piston, a ball nut that surrounds and is in engagement with the toothed wheel and an electromotor that rotates the ball nut for movement of the piston between the upper and lower position of the piston in the cylinder. A possibility is also to allow the electromotor to drive the piston directly in that the electromotor drives a shaft which at its end is provided with threads that engage with corresponding threads in the piston. When the electromotor rotates the shaft, the piston is screwed up or down depending on the rotational direction of the shaft.

Power for operating the electromotor can be provided by a battery arranged in the rolling device. The battery capacity is chosen such that the battery can deliver power for an expected number of raising/lowering operations per year for an expected number of years during which the rolling device is to be used. The battery can optionally be replaceably arranged in the rolling device such that it can be replaced when necessary.

It is also possible to use one or more chargeable batteries to provide the power to the electromotor and one or more solar cells that are arranged in or on the outer surfaces of the rolling device to charge the chargeable battery or batteries. Thus, daylight can be used to charge the battery or batteries, thereby obviating the need to remember to check the batteries and to change battery, and thus preventing a battery being found to be flat when it is desired to move the device across the surface. It will also be possible to use a chargeable battery that is charged by means of a wireless charging system, such as, for example, by means of inductive power.

An alternative is also to provide the rolling device with a power cable that is connected to the electromotor, such that the rolling device can be connected to the mains. Some pieces of furniture and other devices are already at the outset equipped with a power supply for other purposes that are usually connected to the mains. For example, there are beds that can be set in different positions by means of one or more electromotors. For such pieces of furniture and devices, the rolling device can of course use the same power supply and be connected to the same power supply internally in the piece of furniture or device.

Alternatively, the actuator system can comprise an electromagnetic solenoid that has a two-way neodymium lifting magnet. The electromagnetic solenoid is connected to a power source, such as a battery arranged in the rolling device, or to the mains. In addition, the rolling element or piston is magnetic or is wholly or partly made of a ferromagnetic material, i.e., a material that is magnetized when in a magnetic field. The rolling element or piston can also be provided with a magnetic element that is integrated in the rolling element or in the piston.

An electromagnetic solenoid of this kind which has a two-way neodymium lifting magnet, and a magnetic or magnetizable rolling element, or optionally a magnetic or magnetizable piston in which the rolling element is mounted, is especially useful in connection with a rolling device where the rolling device comprises a spring element that presses the rolling element outwards and a click system as described in Norwegian Patent No. 316760. When the electromagnetic solenoid is supplied with power, the magnet attached to the solenoid is activated and will attract the magnet that sits in the spherical wheel with the result that the rolling device is lifted up and sets the wheel in rolling mode. When the magnet is deactivated by cutting off the power supply, the lifting force ceases to be effective, and the spherical wheel can consequently be moved in all directions. To lock the spherical wheel, the magnet is activated again and the wheel will then be clicked back into place in locked mode so that it cannot be moved.

When the rolling device comprises a rolling element that is arranged in a piston that moves in and out of a cylinder between an upper position and a lower position as shown in detail in the attached figures, a magnetic rolling element can be used or a magnet can be arranged in the piston. The electromagnetic solenoid is arranged on the upper side of the cylinder, preferably in the rolling device housing. When the rolling element is in the upper position in the cylinder, i.e., that the rolling element has been retracted into the cylinder, the electromagnetic solenoid is supplied with power such that it is given a polarity which results in a repelling force between the solenoid and the magnetic rolling element, or the magnet in the piston will be pushed outwards in the cylinder until the rolling element is in the lower position in which the rolling device can be rolled across a surface. When the power is switched off, the weight of the device in which the rolling device is arranged will normally ensure that the piston and the rolling element are pushed into the cylinder again. Alternatively, power can be applied to the electromagnetic solenoid such that an attracting force arises between the rolling element or the piston and the electromagnetic solenoid and piston and rolling element are retracted into the cylinder.

Power for operating the electromagnet can be provided by a battery that is arranged in the rolling device, or by a power cable that is connected to the electromagnetic solenoid, thereby allowing the rolling device to be connected to the mains. The battery capacity is preferably chosen such that the battery can supply power for an expected number of raising/lowering operations per year for an expected number of years during which the rolling device is to be used. The battery can optionally be replaceably arranged in the rolling device such that it can be replaced when necessary.

If the piece of furniture or device in which the rolling device is arranged is already equipped with a power supply for other purposes that is connected to the mains, for example, beds that can be adjusted to different positions by means of one or more electromotors as mentioned above, the rolling device can of course use the same power supply and be connected to the same power supply internally in the piece of furniture or device.

The rolling device further preferably comprises a control device for controlling the actuator system, the control device comprising an antenna for wireless signal transmission to the control device. This may be Bluetooth or other suitable technologies that can be used to transmit signals wirelessly. It is also conceivable that the rolling device actuator system can be controlled manually, for example, by start and stop switches. The start and stop switch(es) may be manual buttons. Alternatively, a sensor can be used, such as, for instance, a pressure-sensitive sensor, that starts the process of raising or lowering the piece of furniture or device of which the rolling device is a part, when the sensor registers touch. Usually, the piece of furniture or device will be provided with a number of rolling devices, for example, a bed will normally be provided with one rolling device in each leg, and to eliminate the need to depress a button or touch a sensor on every single leg, the rolling devices can be adapted such that they communicate wirelessly, for example, by means of Bluetooth as mentioned above. In that case, one button/switch or one sensor is preferably used that communicates with the other rolling devices, preferably wirelessly via Bluetooth, such that when one of the rolling devices is activated by touching the sensor or depressing the button/switch, depending on whether a sensor or a button/switch is provided, a signal is transmitted to the other rolling devices such that the rolling device pistons with rolling elements are pushed out of or drawn into their respective cylinders simultaneously.

The piston is preferably configured with a cavity that extends inside the piston from an opening at the first end portion of the piston, in which cavity the rolling element is at least partially arranged. The rolling element is, in other words, held in place in the piston, but to allow the rolling device to roll along the surface when moving the piece of furniture or device in which the rolling device is arranged, a part of the rolling element must necessarily lie outside the piston opening.

The piston may further comprise a bearing plate that is arranged in the cavity and is configured with a spherical bearing surface that rests against a corresponding spherical bearing surface in the cavity such that the bearing plate is rotatably supported. The bearing plate preferably comprises a projection with an end portion, the spherical bearing surface of the bearing plate being arranged on the end portion of the projection. Similarly, the cavity preferably comprises a recess in which the spherical bearing surface of the cavity is arranged. In the cavity, in the area between the bearing plate and the rolling element and between the bearing plate and the cavity, there is preferably arranged a plurality of bearing balls.

There is also provided a piece of furniture comprising at least one support element that bears the weight of the piece of furniture and stands on a surface, where the support element comprises at least one rolling device as described above for moving the piece of furniture across the surface.

There is also provided a use of one or more rolling devices as described above in a piece of furniture, a movable wall, a machine, a trolley, a crate, a container etc. for rolling movement along a surface and to take up a stable position when moving has been carried out.

BRIEF DESCRIPTION OF THE DRAWINGS

Some non-limiting embodiments of the present invention will be described below, wherein:

FIG. 3 illustrates a rolling device according to the present invention where the piston is moved by a fluid stored in the rolling device;

FIG. 4 illustrates a rolling device according to the present invention where the piston is moved by a mechanical solution;

FIG. 5 illustrates a rolling device according to the present invention where the piston is moved by a fluid that is supplied from an external source;

DETAILED DESCRIPTION OF THE DRAWINGS

Figure 1:
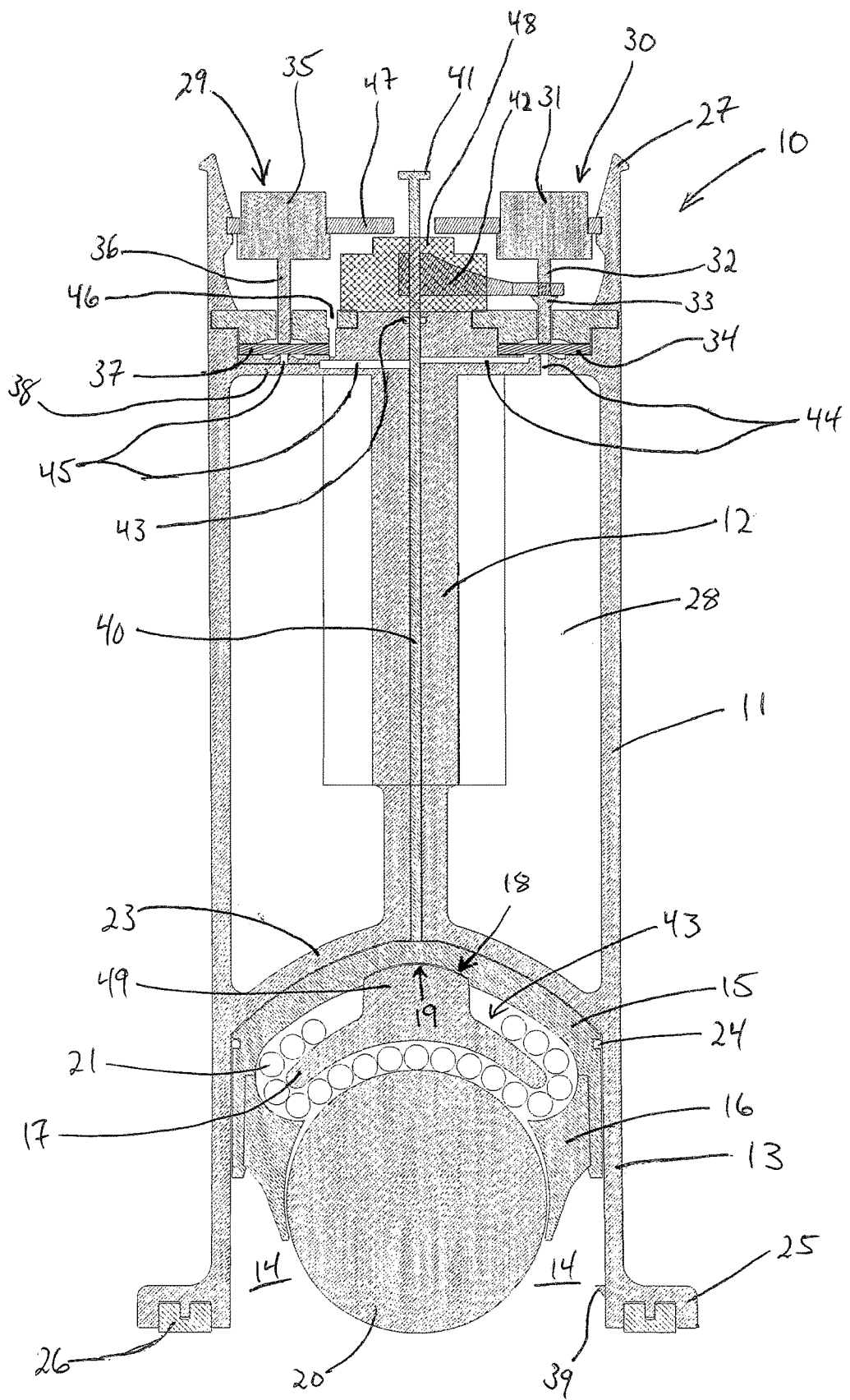
FIG. 1 illustrates a cross-section through a rolling device according to the present invention, where the piston is in an upper position.

It should first be mentioned that the same reference numerals are used in all the figures to designate the same technical features in the different embodiments of the rolling device.

Figure 2:
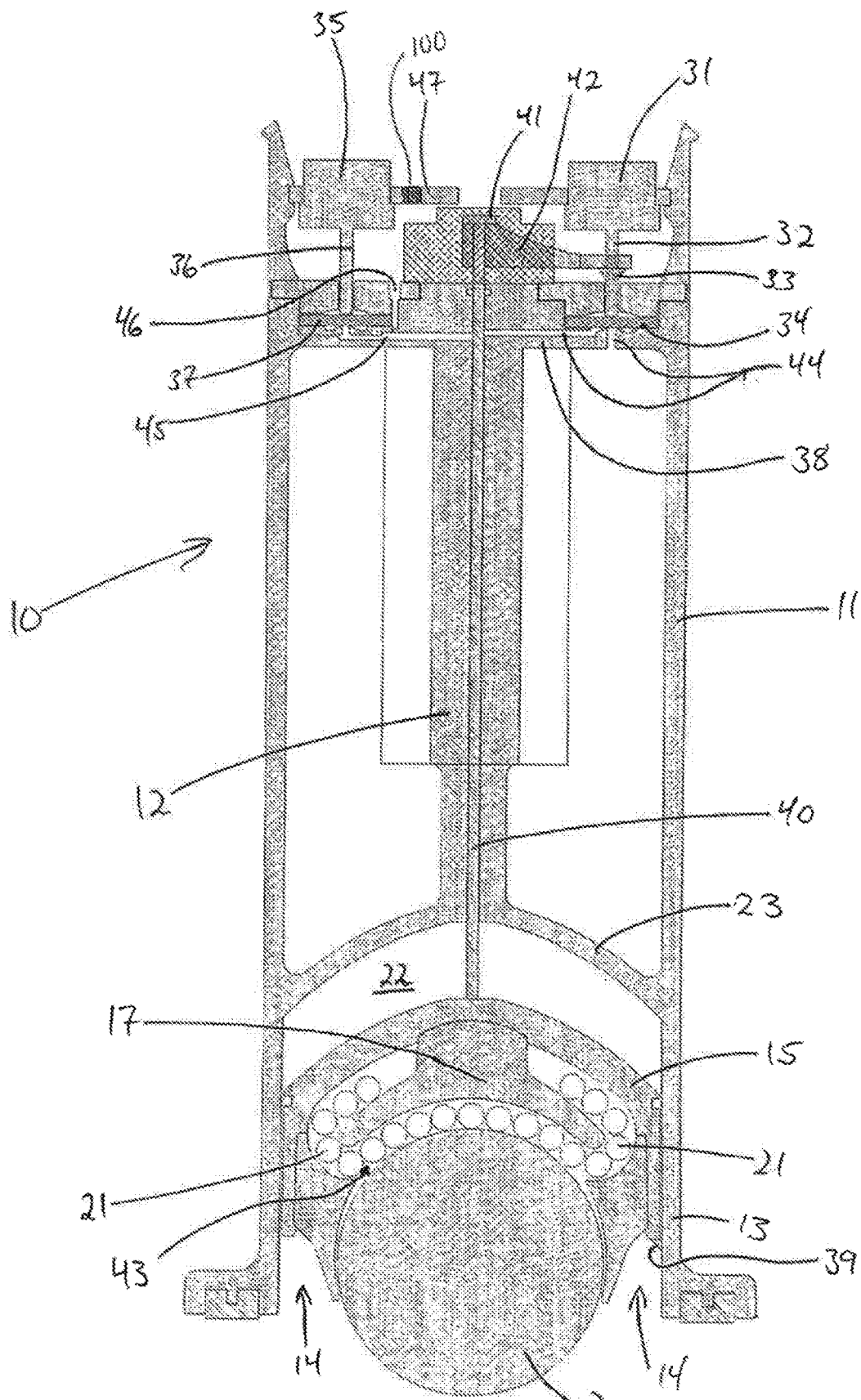
FIG. 2 illustrates a cross-section through the rolling device as shown in FIG. 1, but where the piston is in a lower position.

FIGS. 1 and 2 show a first embodiment of the rolling device 10 and will therefore be described together.

The rolling device 10 comprises a housing 11 with an opening 14 at one end and a bottom 38 at the other end. The housing 11 is further configured with a cylinder bottom 23 such that the lower portion of the housing forms a cylinder 13 and a stem that extends through the housing 11 from the cylinder bottom 13 to the bottom 38 of the housing.

In the cylinder 13 is arranged a piston 15 that can be moved between an upper position in which the piston will preferably rest against the cylinder bottom 23, and a lower position in which the piston 15 rests against one or more stop edges 39.

FIG. 1 shows the piston 15 in the upper position whilst FIG. 2 shows the piston in the lower position.

On the upper side of the piston 15, between the piston 15 and the cylinder bottom 23, a cylinder volume 22 is formed which has a size that is almost zero when the piston is in the upper position as shown in FIG. 1, and which is of maximum size when the piston is in the lower position as shown in FIG. 2. On the outside of the piston 15 there is preferably arranged a seal 24 which seals between the piston and the cylinder 13 so as to prevent a pressurized fluid that is in the cylinder volume 22 from leaking out.

The piston 15 is preferably configured with a hollow space or cavity 43. In the cavity 43 there is arranged a bearing plate 17. The bearing plate 17 is configured with a first spherical bearing surface 18, preferably on a projection 49 of the bearing plate. In a recess in the piston 15 is configured a corresponding second spherical bearing surface 19 against which the first spherical bearing surface 18 rests. The bearing plate 15 is thus capable of moving slightly in all directions.

The piston 15 further comprises one or more holding members 16 which hold the rolling element 20 in place in the piston. The holding members 16 are preferably configured such that there is some clearance between the rolling element 20 and the holding member or members 16. This makes it easier to slip the rolling element 20 into place and also means that there is less friction between the rolling element 20 and the holding member(s) 16 such that the rolling element rolls more easily.

In the area between the bearing plate 17 and the rolling element 20, and between the bearing plate and the rest of the piston 15, there is arranged a number of bearing balls 21 on which the rolling element rests.

The rolling element 20 is preferably made of a rubber material that is capable of changing shape slightly when loaded, which means that the rolling element can be displaced slightly to the side and press on the bearing balls 21. When this happens, there is a risk that the rolling element will not roll. To avoid this, the bearing plate 17 and the piston 15 are configured with corresponding first and second spherical bearing surfaces 18, 19 such that the bearing plate 15 can yield somewhat when the bearing balls are pressed by the rolling element 20.

As mentioned in the first part of the description, it is also possible to use a wheel-shaped or spherical rolling element that is supported at the first end portion of the piston, or is fastened to the first end portion of the piston by means of a bracket part, such that the wheel can rotate about a horizontal axis thereby allowing the wheel to roll on the surface, and preferably so that the wheel also can rotate about a vertical axis, thereby allowing the wheel to swivel and the device to be rolled in a desired direction across the surface.

At the lower end portion, the housing 11 is further configured with a foot part 25 which preferably comprises a protective ring 26 to prevent scratches and other damage to the surface when the piston 15 and the rolling element 20 are in the upper position in the cylinder 13. The protective ring 26 can, for example, be made of a rubber or plastic material. Alternatively, felt pads or the like can be provided under the foot part 25.

The rolling device 10 further comprises an actuator system for movement of the piston 15 in the cylinder 13 between the upper position and the lower position. In the embodiment shown in FIGS. 1 and 2, the actuator system comprises gas tank 28 that is preferably integrated in the rolling device 10. The gas tank can, for example, be arranged in the housing 11, between the cylinder bottom 23 and the housing bottom 38 as shown in FIGS. 1 and 2.

The actuator system further comprises a piston rod 40 which at one end is fastened to the piston 15 and extends through the stem 12 in the housing 11 and the bottom 38 and then projects up from the bottom 38. At the other end, the piston rod 40 is configured with a transverse element 41. From the gas tank 28 runs a gas channel 44 to the piston rod 41, whilst between the piston rod 40 and the stem 12 there is a clearance that means gas can flow from the gas tank 28 to the cylinder volume 22 when the gas channel 44 is open for throughflow of gas. From the piston rod 40, just above the bottom 38, there runs another gas channel 45 that communicates with the gas channel 46. The gas channel 46 communicates with the exterior of the rolling device 10 such that when the gas channel 45 is open for throughflow of gas, gas can flow from the cylinder volume 22, via the clearance between the piston rod 40 and the stem 12, and out through the gas channels 45 and 46. The cylinder volume 22 can thus be emptied of gas.

To control the flow of gas from the gas tank 28 to the cylinder volume 22, the rolling device 10 is provided with an inlet valve device 30 comprising a valve rod 32 which at one end is connected to a solenoid 31 and is configured with a shoulder 33 at a middle portion. The other end of the valve rod 32 rests against a valve membrane 34 which lies over the gas channel 44 and shuts off and admits throughflow of gas from the gas tank 28. An arm 42 is slidably connected to the piston rod 40 at one end and slidably connected to the valve rod 32 at the other end.

To control the flow of gas from the cylinder volume 22 and out of the rolling device 10, the rolling device 10 is provided with an outlet valve device 29 comprising a valve rod 36 that at one end is connected to a solenoid 35. The other end of the valve rod 36 rests against a valve membrane 37 that lies over the gas channel 45 and shuts off and admits throughflow of gas from the cylinder volume 22.

To prevent gas escaping in the clearance around the piston rod 40, a seal 43 is provided just above the gas channels 44 and 45.

The rolling device 11 further comprises a control device 47 which, inter alia, comprises an antenna 100 and PCB (i.e., a printed circuit board) with electronics for control of the solenoids 31 and 35. A battery 48 provides power that is necessary for operation of the control device 47 and the valve devices 29 and 30. The rolling device 10 is preferably provided with a battery which lasts throughout the lifetime of the rolling device, but it is of course also possible to configure the rolling device such that batteries can be changed when there is a need to do so.

Figure 7:
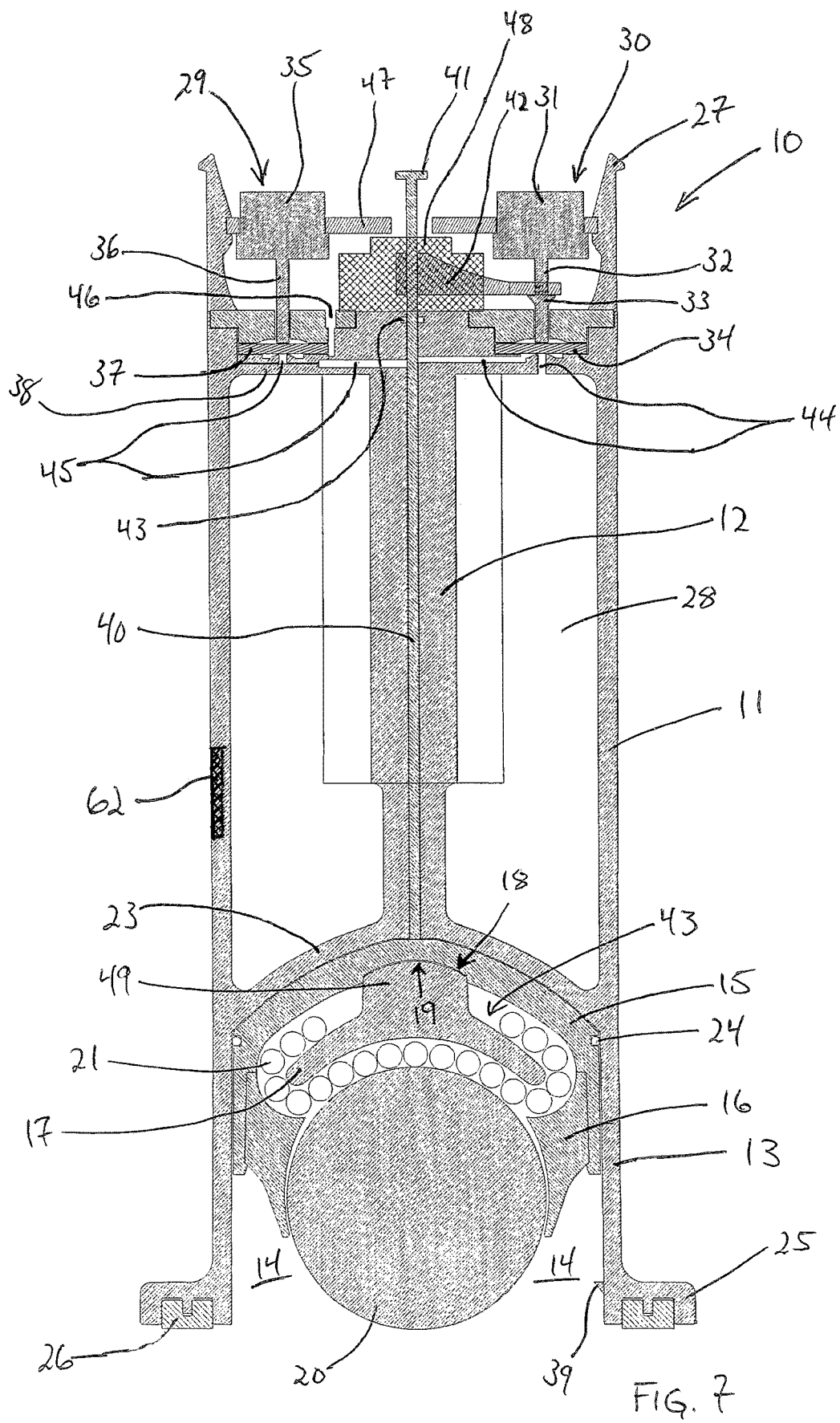
FIG. 7 illustrates a rolling device provided with a starting device.
Figure 8:
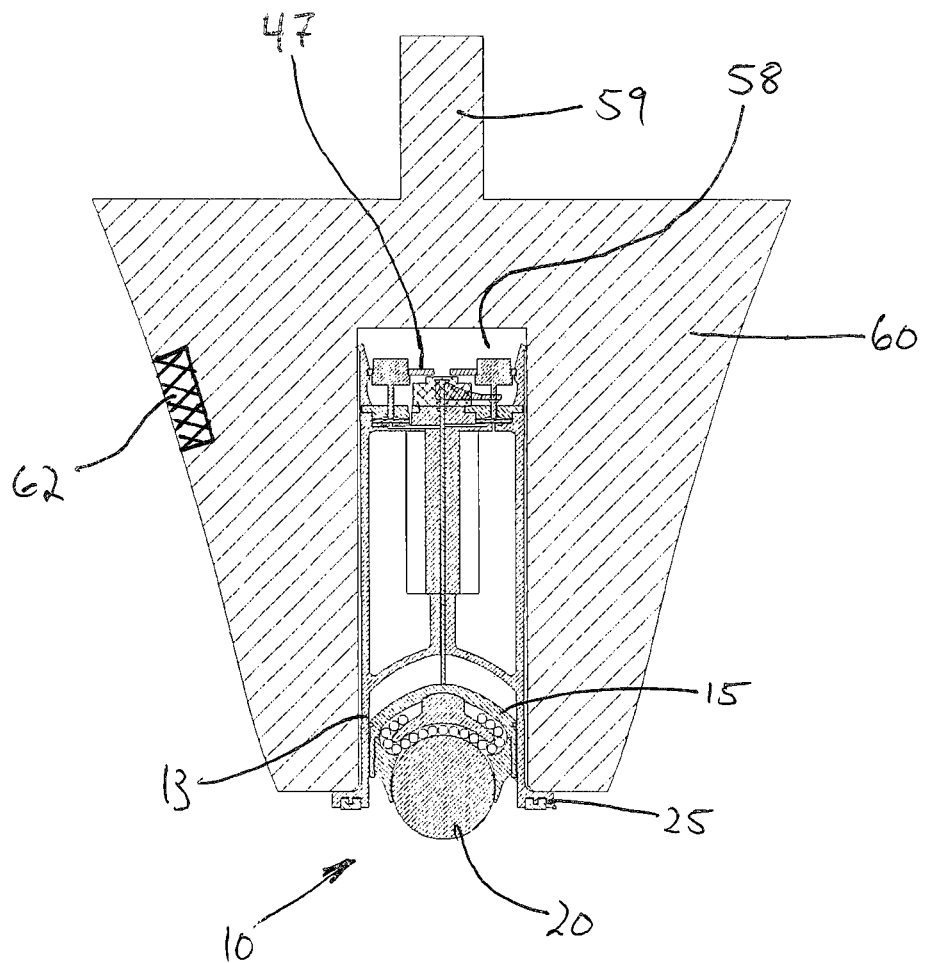
FIG. 8 illustrates a furniture part with an integrated rolling device, where the furniture part is provided with a starting device.

The control device antenna 100 is adapted to receive signals from a remote control, for example, by using Bluetooth technology. When the antenna receives a signal, it will send a signal that triggers one of the solenoids 31 or 35, depending on the signal that is received. It is also possible to use a sensor, such as, for instance, a pressure-sensitive sensor, or a button or switch to activate the movement of the piston 15 between the upper and lower position in the cylinder 13. This is shown in FIGS. 7 and 8 and is described in more detail below.

In use, the rolling device 10, that is shown in FIGS. 1 and 2, works in the following way. When the piston 15 is in an upper position, the rolling element 20 is inside the cylinder 13 and the device in which the rolling device 10 is arranged is standing on the surface. If the antenna 100 receives a signal that the piston with the rolling element 20 is to come out of the cylinder 13, the control device will ensure that the solenoid 31 receives a current pulse which draws the valve rod 32 up and into the solenoid 31. The gas pressure from the gas tank then lifts the valve membrane 34 up and admits flow of gas through the gas channel 44, down through the clearance between the piston rod 40 and the stem 12 and into the cylinder volume 22. The whole area of the valve membrane will now be subjected to the gas pressure such that the force exceeds the spring pressure from the solenoid 31. The piston 15 then moves out of the cylinder 13 until the piston 15 reaches the desired position in which the transverse element 41 on the piston rod 40 grips the arm 42 that is pushed down against the shoulder 33 on the valve rod 32. The valve rod 32 is pushed down against the valve membrane 34 that is pushed towards the opening in the gas channel 44. Thus, the gas channel 44 is shut off to further throughflow of gas. The stop edge 39 will prevent the piston from coming out of the cylinder 13 uncontrolled.

If the antenna 100 now receives a signal that the piston with rolling element 20 is to move into the cylinder 13, the control device 47 will ensure that the solenoid 35 receives a current pulse that the valve rod 36 up and into the solenoid 31. The gas pressure from the cylinder volume 22 then lifts the valve membrane 37 up and allows throughflow of gas from the cylinder volume 22 through the clearance between the piston rod 40 and the stem 12 and further out in the gas channel 45 and out in the gas channel 46.

In FIGS. 3-5, three other actuator systems are shown, which like the embodiment of the rolling device 10 shown in FIGS. 1-2, can be used to move the piston 15 between the upper position in the cylinder 13, in which the rolling element 20 is inside the cylinder 13, to the lower position in the cylinder 13 in which the rolling element 20 projects partly from the cylinder 13 such that the device in which the rolling device 10 is arranged is able to roll across the surface it is standing on.

FIG. 3 shows an actuator system that comprises an electromotor 50 which is arranged inside the housing 11. The electromotor 50 is connected to a shaft 51 that drives a pump 52. The rolling device 11 also comprises a reservoir 61 for a liquid and a liquid channel 53 connecting the reservoir 61 to the pump and then to the cylinder volume 22. When the piston 15 is to move out of the cylinder 13, the electromotor starts on a signal from the control device (not shown in FIG. 3), and drives the pump 52 which pumps liquid from the reservoir 61 to the cylinder volume 22. The piston 15 is thus moved out of the cylinder 13. When the piston is to be moved back into the cylinder, the liquid can be passed back through the liquid channel 53. The weight of the device in which the rolling device 10 is arranged, will press the piston into the cylinder and the liquid out of the cylinder volume and back to the reservoir 61.

In FIG. 4 another actuator system is shown comprising an electromotor 50 that is arranged in the housing 11. A shaft 51 is connected to the electromotor 50 and a toothed wheel 54. The toothed wheel 54 is in engagement with a ball nut 55. The ball nut 55 surrounds the ball screw 56 that is fastened to the piston 15. When the electromotor 50 rotates the shaft 51, the toothed wheel 54 will rotate the ball nut 55 which thus screws the ball screw 56 and the piston 15 out of the cylinder 13 or into the cylinder 13 depending on the rotational direction of the shaft 51.

The electromotors 50 that are described in connection with FIGS. 3 and 4 above can be operated by battery (not shown in the figures). The battery can be dimensioned to be able to supply power for a certain number of movements of the piston 15 in and out of the cylinder 13 corresponding to an expected number of movements in the course of the rolling device's lifetime. The battery can also be replaceably arranged in the rolling device. It can also be chargeable, either in that it is removed and charged before being put back in the rolling device, or that the rolling device is connected to an external power supply, for example, the mains or a generator, for charging the battery. As mentioned in the first part of the description, the batteries may alternatively be chargeable and be charged using solar cells that are arranged in or on the outer surface of the rolling device or by using a wireless charging system such as inductive current.

Alternatively, the rolling device can be provided with a power supply such that it can be connected to the mains by a power cable. If the piece of furniture or device is provided with a plurality of rolling devices, all the rolling devices will preferably be connected to the power supply for supply of electric power from the mains for operation of the rolling devices. In particular, if the piece of furniture or device in which the rolling device is arranged is provided with power supply for another purpose, for example, beds that use electric motors to change the form of the bed base or pieces of furniture and devices that are provided with lighting, it may be expedient to also allow the rolling device to be operated by the same power supply in the piece of furniture or device that receives power from the mains.

The electromotor 50 in FIGS. 3 and 4 is preferably controlled by means of a control device (not shown in the figures). When the control device receives a signal, either wirelessly from a remote control or a starting device 62 (see FIGS. 7 and 8), or optionally via a signal cable from a starting device 62 (see FIGS. 7 and 8), the electromotor will push the piston 15 into a position in which the rolling element 20 is in contact with the surface such that the rolling device 10, and the piece of furniture or device in which it is arranged, can be rolled over the surface, or into a position in which the rolling element 20 is drawn into the cylinder 13 such that the foot part 25 is in contact with the surface.

FIG. 5 shows a rolling device 10 with the piston 15 that is arranged in the cylinder 13 in the same way as described in connection with the embodiment in FIGS. 1 and 2. A fluid channel 62 is arranged through the housing to the outside of the housing. Instead of having an integrated gas tank in the rolling device, as shown in FIGS. 1 and 2, a fluid channel 57 is shown, which, for example, may be a hose that is connected to the outlet of the fluid channel 62, thereby forming a continuous fluid channel from the end of the hose 57 to the cylinder volume 22. The fluid channel 57 can thus be connected to an external gas tank, which simplifies replacement of the gas tank. Normally, the gas tank will be filled with sufficient gas for the rolling device to function for an expected number of years with a given number of movements of the piston 15 in and out of the cylinder 13. However, cases are conceivable where pieces of furniture or other devices in which the rolling device 10 is arranged, are moved very often, and that it may thus be advantageous to use a gas container that can easily be replaced, such as in the embodiment shown in FIG. 5.

Figure 6:
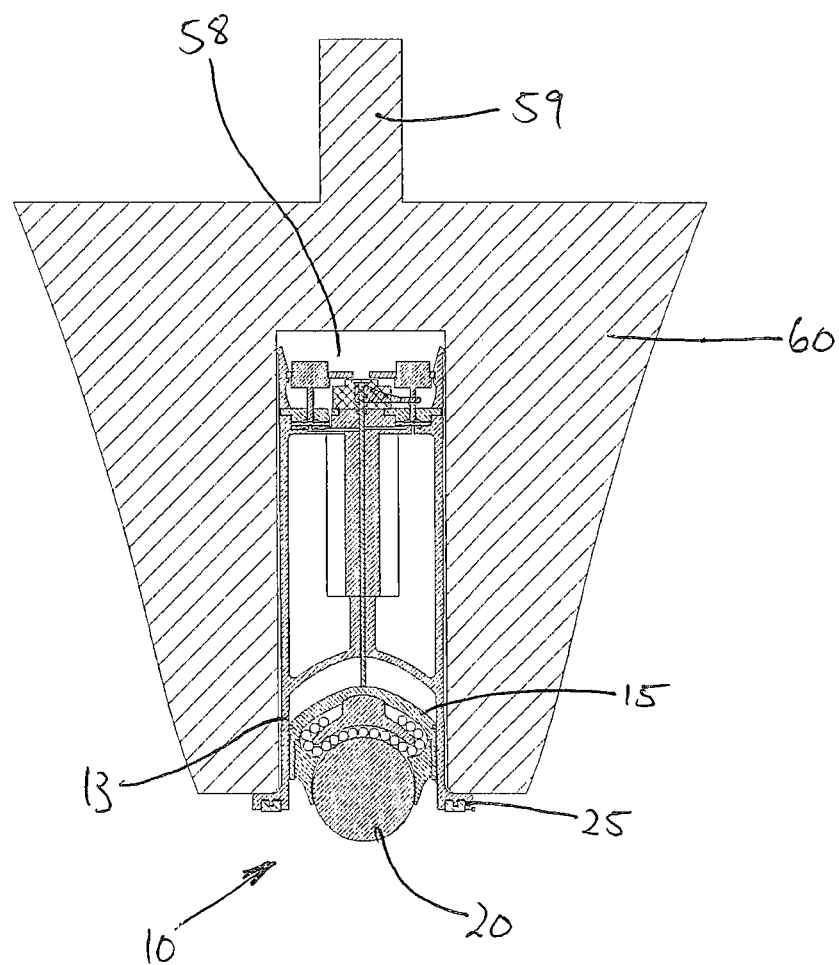
FIG. 6 illustrates a furniture part where a rolling device is integrated in the furniture part and where the piston is in a lower position in which the rolling element can roll on the surface.

In FIG. 6 a typical furniture part is shown, for example, a leg of a bed, table, sofa or the like, in which a rolling device 10 is mounted. The furniture part is configured with a cavity 58 that is adapted to the outer dimensions of the rolling device 10, and a fastening device for fastening the furniture part to the piece of furniture. The rolling device 10 is introduced into the cavity 58, whereafter the retaining elements 27 prevent the rolling device 10 from falling out of the cavity 58.

FIG. 6 shows the piston 15 in its lower position in the cylinder 13 where the rolling element 20 projects from the rolling device and lies on the surface and is able to roll across the surface. The piece of furniture to which the furniture part 60 is fastened, can now be rolled across the surface. When the piston 15 is moved into its upper position in the cylinder 13, the rolling element 20 will be just above the foot part 25 which thus stands on the surface. The piece of furniture to which the furniture part 60 is fastened will thus stand steady on the surface.

FIGS. 7 and 8 show an alternative to using a remote control for starting a movement of the piston 15 out of the cylinder when the piece of furniture or device is to be rolled across a surface, or into the cylinder when the piece of furniture or device has been rolled to the desired position and it is desired that the piece of furniture or device should have a stable position, i.e., should not have the possibility of rolling out of the desired position. When the piston 15 moves into the cylinder 13, the rolling element will also be drawn up into the cylinder and the foot part 25 will ultimately be standing steady on the surface.

FIG. 7 shows rolling device 10 as described above, where the housing 11 is provided with a starting device 62 for starting the movement of the piston 15 from an upper to a lower position in the piston 13 when the rolling device is standing on the foot part 25, or for starting the movement of the piston 15 from a lower position to an upper position in the cylinder 13 when the rolling device is standing on the rolling element 20. The starting device 62 preferably comprises a sensor, for example, a pressure-sensitive sensor, which registers that a person touches the sensor. The starting device 62 communicates with the control device 47 preferably wirelessly, for example, through use of Bluetooth technology, or optionally through a cable (not shown in the figures) which connects the starting device 62 and the control device 47. When a person touches the touch-sensitive sensor in the starting device 62, a signal will be sent to the control device 47 and the piston 13 will either move from an upper to a lower position in the cylinder 13 where the rolling element 20 is in contact with the surface such that the piece of furniture or device in which the rolling device 10 is arranged is able to roll across the surface, or move from a lower to an upper position in the cylinder 13 where the rolling element 20 in its entirety is drawn into the cylinder 13 and the foot part 25 is in contact with the surface.

It should also be mentioned that instead of a sensor, the starting device 62 could comprise a switch or a button if so desired. The starting device 62 communicates with the control device 47 wirelessly or by means of a signal cable in the same way as when a sensor is used. By depressing the switch, a person will start a movement of the piston in the cylinder into a position in which the rolling element 20 either is in contact with and can roll across the surface or is drawn inside the cylinder such that the foot part 25 is in contact with the surface.

FIG. 8 shows a rolling device 10 that is arranged in a cavity 58 in a furniture part 60 as shown in FIG. 6. When the rolling device 10 is arranged so as to be integrated in a furniture part as shown in FIGS. 6 and 8, the furniture part 60 is provided with a starting device 62 on the outside that functions in the same way as explained in connection with FIG. 7 above. The starting device 62 preferably comprises a sensor or optionally a switch or button as explained above, which communicates with the control device 47, preferably wirelessly or optionally in that a signal cable (not shown in the figure) connects the starting device 62 and the control device 47. When the pressure-sensitive sensor is touched, optionally if the switch or button is depressed, the control device 47 will actuate a movement of the piston 15 between an upper and a lower position or from a lower to an upper position in the cylinder 13, depending on whether the piston is in the upper or lower position.

If a piece of furniture or a device is provided with a plurality of rolling devices 10, which normally will be the case, preferably only one rolling device or optionally one furniture part if the rolling device is arranged integrated in the furniture part as shown in FIGS. 6 and 8, is provided with a starting device 62. The one starting device 62 then communicates with the control devices 47 in all the rolling devices 62, preferably directly or optionally via the control device 47 in the rolling device in which the starting device 62 is arranged. It is also possible to let the control device 47 in the rolling device 10 in which the starting device 62 is arranged, control all the other rolling devices 10 with which a piece of furniture or a device is provided. When the starting device's pressure-sensitive sensor is touched, optionally the switch is depressed, the pistons 15 in all the rolling devices 10 will thus be moved simultaneously from an upper to a lower position in the cylinder 13 or from a lower to an upper position in the cylinder 13.

Figure 9:
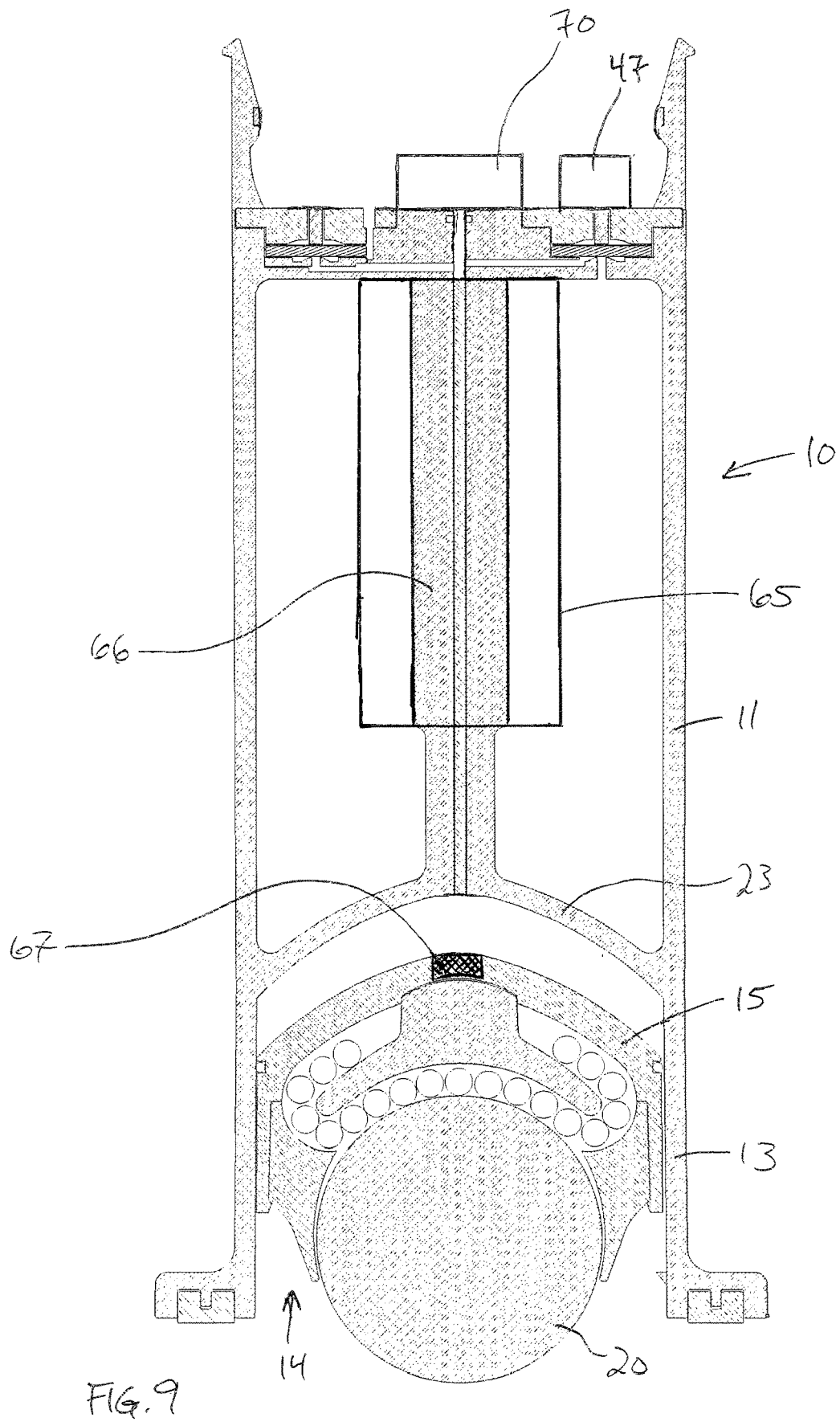
FIG. 9 illustrates a rolling device according to the present invention where the piston is moved by an electromagnetic system.

FIG. 9 shows the rolling device 10 with an actuator system comprising an electromagnetic solenoid 65 that is preferably arranged in the housing 11 on the upper side of the cylinder 13. The solenoid 65 is preferably provided with a neodymium magnet 66 to increase the magnetic force that the electromagnetic solenoid 65 is able to exert. The electromagnetic solenoid 65 is electrically connected to a battery 70 with a switch that can turn the power to the electromagnetic solenoid on and off. This is controlled by the control device 47 which preferably receives signals from a remote control or a sensor in the same way as described above. Alternatively, the electromagnetic solenoid 65 is connected to the mains by means of electric cables. In the piston 15, as shown in FIG. 9, a magnet 67 is arranged. When current is sent through the solenoid 65 and the piston is in the upper position, the solenoid 66 will set up a magnetic field that causes a repelling force on the magnet 67 such that the piston and the rolling element 20 move into the lower position in which the rolling device 10 can be rolled across a surface. When the power to the electromagnetic solenoid is switched off, the repelling magnetic field will disappear and the piston with the rolling element 20 will be pushed into the upper position because of the weight of the piece of furniture or the device in which the rolling device 10 is arranged. Alternatively, the direction of current through the solenoid 65 can be turned such that a magnetic field is formed that attracts the magnet 67 in the piston 15 such that the piston and the rolling element are retracted into the upper position in the cylinder 13.

The invention claimed is:

1. A rolling device for use in combination with a device to make the device movable along a surface, the rolling device being operable independently of the device to be moved, the rolling device comprising:
    a housing defining a cylinder at one end thereof, the cylinder having an open lower end;
    a piston disposed in the cylinder so as to be reciprocally movable in the cylinder such that the piston can be moved between an upper position in the cylinder and a lower position in the cylinder, the piston including a rolling element that is arranged at a first end portion of the piston facing the cylinder opening and that can roll on the surface when the piston is in the lower position;
    an actuator system including an electromotor, arranged inside the housing, for moving the piston between the lower position where the rolling element projects from the lower end of the cylinder for rolling on the surface, and the upper position where the rolling element is retracted into the cylinder and is not capable of rolling on the surface; and
    a starting device for transmitting a signal to the electromotor, such that the electromotor moves the piston into the lower position or the upper position in response to the signal.

2. A rolling device according to claim 1, wherein the actuator system further comprises a ball screw that is fastened to the piston; and a ball nut that surrounds and is in engagement with the ball screw, wherein the electromotor rotates the ball screw for moving the piston between the upper and lower positions in the cylinder.

3. A rolling device according to claim 1, wherein the piston is configured with a cavity that extends from a first end portion of the piston, and the rolling element is at least partially arranged in the cavity.

4. A rolling device according to claim 3, wherein the piston further comprises a bearing plate that is arranged in the cavity and is configured with a first spherical bearing surface that rests against a second spherical bearing surface formed in an opposing surface of the piston.

5. A rolling device according to claim 4, wherein the bearing plate comprises a projection with an end portion, the first spherical bearing surface is arranged on the end portion of the projection, and the piston defines a recess in which the second spherical bearing surface is arranged.

6. A rolling device according to claim 1, wherein the starting device comprises a touch-sensitive sensor or a button or a switch.

7. A piece of furniture comprising at least one support element that bears the weight of the piece of furniture and stands on a surface, wherein the support element comprises at least one rolling device according to claim 1 for moving the piece of furniture across the surface.

8. A rolling device for use in combination with a device to make the device movable along a surface, the rolling device being operable independently of the device to be moved, the rolling device comprising:

a housing defining a cylinder at one end thereof, the cylinder having an open lower end;

a piston disposed in the cylinder so as to be reciprocally movable in the cylinder such that the piston can be moved between an upper position in the cylinder and a lower position in the cylinder, the piston including a rolling element that is arranged at a first end portion of the piston facing the cylinder opening and that can roll on the surface when the piston is in the lower position;

an actuator system including an electromotor, arranged inside the housing, for moving the piston between the lower position where the rolling element projects from the lower end of the cylinder for rolling on the surface, and the upper position where the rolling element is retracted into the cylinder and is not capable of rolling on the surface; and a control device for controlling the actuator system, the control device being configured to receive a wireless signal and control the electromotor of the actuator system, such that the electromotor moves the piston into the lower position or the upper position.

* * * * *